United States Patent
Li

(10) Patent No.: US 9,998,610 B2
(45) Date of Patent: Jun. 12, 2018

(54) CONTROL APPARATUS, CONTROL METHOD, AND COMPUTER-READABLE MEDIUM

(71) Applicant: Asahi Kasei Microdevices Corporation, Tokyo (JP)

(72) Inventor: Haizhen Li, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 112 days.

(21) Appl. No.: 14/436,585

(22) PCT Filed: May 12, 2014

(86) PCT No.: PCT/JP2014/002502
§ 371 (c)(1),
(2) Date: Apr. 17, 2015

(87) PCT Pub. No.: WO2014/192235
PCT Pub. Date: Dec. 4, 2014

(65) Prior Publication Data
US 2015/0271345 A1    Sep. 24, 2015

(30) Foreign Application Priority Data

May 29, 2013    (JP) .................................. 2013-112929

(51) Int. Cl.
*H04R 29/00*    (2006.01)
*H04M 19/04*    (2006.01)
(Continued)

(52) U.S. Cl.
CPC ............. *H04M 19/04* (2013.01); *H04M 3/02* (2013.01); *H04M 9/082* (2013.01);
(Continued)

(58) Field of Classification Search
CPC ...... H04M 19/044; H04M 9/082; H04M 3/02; H04M 19/04; H04R 3/00; H04R 2430/01; H04R 2499/11
(Continued)

(56) References Cited

U.S. PATENT DOCUMENTS 5,390,244 A * 2/1995 Hinman ................... H04Q 1/46
379/386
2003/0039352 A1  2/2003 Joncour et al.
(Continued)

FOREIGN PATENT DOCUMENTS

DE       10039211 A1   2/2002
JP       H09-008707 A   1/1997
(Continued)

OTHER PUBLICATIONS

International Search Report dated Aug. 12, 2014, for International application No. PCT/JP2014/002502.
(Continued)

*Primary Examiner* — Vivian Chin
*Assistant Examiner* — Con P Tran
(74) *Attorney, Agent, or Firm* — Morgan, Lewis & Bockius LLP

(57) ABSTRACT

The surrounding environment where an electronic apparatus is placed is detected according to external sounds, and therefore it is difficult to accurately switch the output of a ring-tone. A control apparatus controls the sound generated by the electronic device. The control apparatus includes a sound producing section that outputs a sound output signal causing a sound output section to generate the sound, a sound acquiring section that acquires a sound input signal generated from external sound, and an adjusting section that adjusts the sound output signal or the output of an output
(Continued)

device according to the sound input signal acquired in a state where the sound is being generated.

26 Claims, 14 Drawing Sheets

(51) Int. Cl.
    *H04R 3/00*     (2006.01)
    *H04M 3/02*     (2006.01)
    *H04M 9/08*     (2006.01)

(52) U.S. Cl.
    CPC ............ *H04M 19/044* (2013.01); *H04R 3/00* (2013.01); *H04R 2430/01* (2013.01); *H04R 2499/11* (2013.01)

(58) Field of Classification Search
    USPC .... 381/58, 71.11, 59, 56, 57, 103, 102, 101, 381/98, 122, 104; 455/567; 708/322, 708/422; 700/94
    See application file for complete search history.

(56) References Cited

U.S. PATENT DOCUMENTS

| | | |
|---|---|---|
| 2007/0254627 A1 | 11/2007 | Kikuchi et al. |
| 2009/0305745 A1 | 12/2009 | Satoh et al. |
| 2010/0034395 A1* | 2/2010 | Lundin ............... H04M 19/044 381/57 |
| 2010/0086122 A1* | 4/2010 | Takada .................. H04M 9/082 379/406.08 |
| 2011/0200210 A1* | 8/2011 | Kemmochi ........... H04M 19/04 381/107 |

FOREIGN PATENT DOCUMENTS

| | | |
|---|---|---|
| JP | H11-068888 A | 3/1999 |
| JP | 2000-152323 A | 5/2000 |
| JP | 2003-125029 A | 4/2003 |
| JP | 2003-174492 A | 6/2003 |
| JP | 2004-179961 A | 6/2004 |
| JP | 2005-217547 A | 8/2005 |
| JP | 2007-300346 A | 11/2007 |
| JP | 2009-296294 A | 12/2009 |
| JP | 2010-200128 A | 9/2010 |
| JP | 2011-171875 A | 9/2011 |

OTHER PUBLICATIONS

International Preliminary Report on Patentability dated Dec. 10, 2015 for corresponding International application No. PCT/JP2014/002502.

\* cited by examiner

CONTROL APPARATUS, CONTROL METHOD, AND COMPUTER-READABLE MEDIUM

The contents of the following Japanese patent application(s) are incorporated herein by reference: No. 2013-112929 filed in JP on May 29, 2013.

BACKGROUND

1. Technical Field

The present invention relates to a control apparatus, a test method, and a computer-readable medium.

2. Related Art

A control apparatus is known that controls an electronic apparatus for switching a ring-tone that is output, as shown in Patent Document 1, for example.

Patent Document 1: Japanese Patent Application Publication No. 2010-200128

However, in such a control apparatus, the surrounding environment where the electronic apparatus is placed is detected according to external sounds, and therefore it is difficult to accurately switch the output of the ring-tone.

SUMMARY

Therefore, it is an object of an aspect of the innovations herein to a control apparatus, a control method, and a computer-readable medium, which are capable of overcoming the above drawbacks accompanying the related art. The above and other objects can be achieved by combinations described in the claims. According to a first aspect of the present invention, provided is a control apparatus that controls sound generated by an electronic apparatus, the control apparatus comprising a sound producing section that outputs a sound output signal causing a sound output section to generate the sound; a sound acquiring section that acquires a sound input signal generated from external sound; and an adjusting section that adjusts the sound output signal according to the sound input signal acquired in a state where the sound is being generated.

According to a second aspect of the present invention, provided is a control method for controlling sound generated by an electronic apparatus, comprising outputting a sound output signal causing a sound output section to generate the sound; acquiring a sound input signal generated from external sound; and adjusting the sound output signal according to the sound input signal acquired in a state where the sound is being generated.

According to a third aspect of the present invention, provided is a computer-readable medium that stores a program that causes a computer to perform control of a sound generated by an electronic apparatus, the program causing the computer to function as a sound producing section that outputs a sound output signal causing a sound output section to generate the sound; a sound acquiring section that acquires a sound input signal generated from external sound; and an adjusting section that adjusts the sound output signal according to the sound input signal obtained in a state where the sound is being output.

According to a fourth aspect of the present invention, provided is a control apparatus that controls output of an output device, the control apparatus comprising a sound producing section that outputs a sound output signal causing a sound output section to generate sound; a sound acquiring section that acquires a sound input signal generated from external sound; and an adjusting section that adjusts the output of the output device according to the sound input signal acquired in a state where the sound is being generated.

According to a fifth aspect of the present invention, provided is a control method for controlling output of an output device, comprising outputting a sound output signal causing a sound output section to generate sound; acquiring a sound input signal generated from external sound; and adjusting the output of the output device according to the sound input signal acquired in a state where the sound is being generated.

According to a sixth aspect of the present invention, provided is a computer-readable medium that stores a program that causes a computer to perform control of output of an output device, the program causing the computer to function as a sound producing section that outputs a sound output signal causing a sound output section to generate the sound; a sound acquiring section that acquires a sound input signal generated from external sound; and an adjusting section that adjusts the sound output signal according to the output of the output device obtained in a state where the sound is being output.

The summary clause does not necessarily describe all necessary features of the embodiments of the present invention. The present invention may also be a sub-combination of the features described above.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
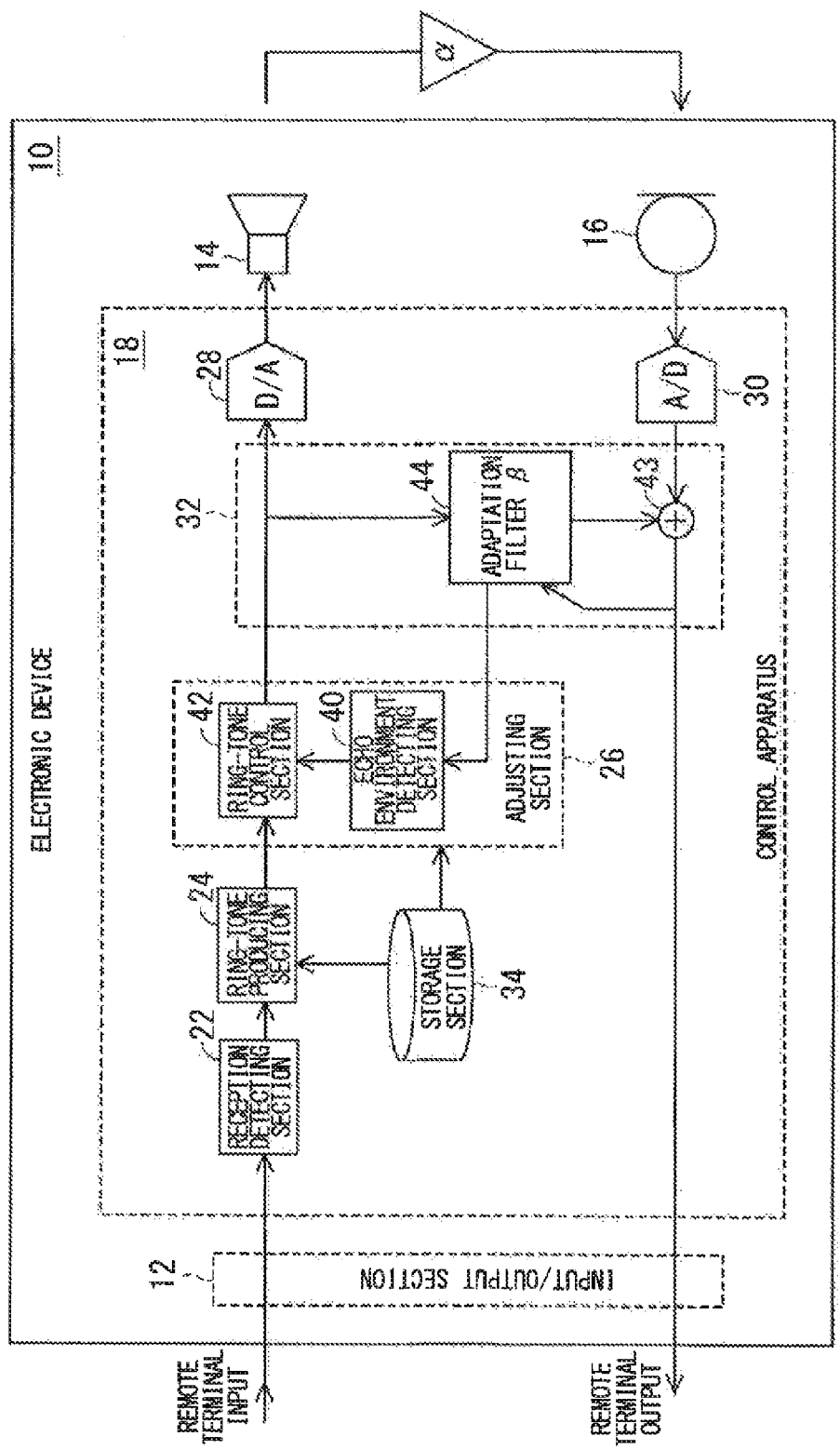
FIG. 1 shows the overall configuration of an electronic apparatus 10 including a control apparatus 18.

FIG. 1 shows the overall configuration of an electronic apparatus 10 including a control apparatus 18. The electronic apparatus 10 is a mobile telephone, a smart phone, and a tablet, for example. The control apparatus 18 of the electronic apparatus 10 adjusts the output sound, e.g. the ring-tone, according to the detected surrounding environment, based on an echo of the output sound, e.g. notification sounds including the sound output upon receiving a call, the sound output upon receiving mail, or the sound of an alarm. In this way, the control apparatus 18 decreases the effect of the surrounding environment, e.g. when the electronic apparatus 10 is stored inside a bag or placed outside on a desk, such that the user can more easily recognize the output sound, e.g. the ring-tone.

As shown in FIG. 1, the electronic apparatus 10 includes an I/O section 12, a sound output section 14, a sound input section 16, and a control apparatus 18.

The I/O section 12 transmits and receives information including audio signals, through wireless communication or the like, with other devices including a mobile device that is a remote terminal, an external device such as a computer, or another electronic apparatus. For example, the I/O section 12 receives, from another mobile device, a reception signal providing notification of reception and a remote input digital signal including an audio signal for conversation. The I/O section 12 is connected to the control apparatus 18. The I/O section 12 outputs, to the control apparatus 18, the received reception signal and remote input digital signal.

The sound output section 14 is a speaker, for example. The sound output section 14 converts the electrical sound output signal that is output by the control apparatus 18 into an output sound, and outputs this output sound. Here, the term output sound includes the sound of conversation and the ring-tone providing notification of reception. The sound output section 14 may be a speaker that outputs a high-volume sound, such as the ring-tone.

The sound input section 16 is a microphone such as a condenser microphone, for example. The sounds of the surrounding environment where the electronic apparatus 10 is placed are input as external sound to the sound input section 16. Furthermore, the output sound output by the sound output section 14, e.g. the direct echo from the sound output section 14 to the sound input section 16 and the echo resulting from the ring-tone reflecting off of the surrounding environment of the electronic apparatus 10, are input to the sound input section 16 as external sound. Here, the echo is the product of the external gain $\alpha$ and the output sound. The sound input section 16 converts the input external sound, which is vibration of air, into a sound input signal, which is an electrical signal, and outputs the sound input signal to the control apparatus 18.

The control apparatus 18 controls the sound generated by the electronic apparatus 10. The control apparatus 18 includes a reception detecting section 22, a ring-tone producing section 24, an adjusting section 26, a D/A converting section 28, an A/D converting section 30, an echo cancelling section 32, and a storage section 34. The reception detecting section 22, the ring-tone producing section 24, the adjusting section 26, the D/A converting section 28, the A/D converting section 30, and the echo cancelling section 32 are each formed by hardware such as a circuit. The control apparatus 18 may be formed by a computer that includes a CPU and the like. In this case, the control apparatus 18 reads a program to function as the reception detecting section 22, the ring-tone producing section 24, the adjusting section 26, the D/A converting section 28, the A/D converting section 30, and the echo cancelling section 32. Furthermore, a portion of the reception detecting section 22, the ring-tone producing section 24, the adjusting section 26, the D/A converting section 28, the A/D converting section 30, and the echo cancelling section 32 may be formed by circuits, while the remaining portions function according to a program.

The reception detecting section 22 is connected to the I/O section 12. The reception detecting section 22 detects reception, by receiving from the I/O section 12 the reception signal that has been demodulated from the digital signal received from the remote terminal. Upon detecting reception, the reception detecting section 22 outputs a detection signal.

The ring-tone producing section 24 is an example of a sound producing section that outputs a sound output signal causing the sound output section 14 to generate the ring-tone, which is one example of a sound. The ring-tone producing section 24 is connected to the reception detecting section 22. When the detection signal indicating that reception from the reception detecting section 22 has been detected is input, the ring-tone producing section 24 acquires the volume and sound output signal of the ring-tone set in advance by the user from the storage section 34, and outputs the volume and sound output signal. In this way, the ring-tone producing section 24 outputs to the adjusting section 26 the sound output signal causing the sound output section 14 to output the ring-tone.

The adjusting section 26 is connected to the ring-tone producing section 24. The adjusting section 26 adjusts and outputs the sound output signal of the ring-tone input from the ring-tone producing section 24 in response to the sound input signal acquired in the state where the output sound is being generated. For example, the adjusting section 26 adjusts the sound output signal according to an echo tap coefficient input from the echo cancelling section 32, which is described further below. The adjusting section 26 includes an echo environment detecting section 40 and a ring-tone control section 42.

The echo environment detecting section 40 is connected to the echo cancelling section 32. The echo environment detecting section 40 acquires an adjustment parameter from the storage section 34 according to the echo tap coefficient, and outputs the adjustment parameter. The adjustment parameter is set according to the surrounding environment, and is a value used to adjust the ring-tone. The surrounding environment includes an uncovered state such as being on a desk and a covered state such as being in a bag.

For example, according to a comparison result obtained by comparing a correlation threshold value to the correlation between the echo tap coefficient and a reference echo tap coefficient stored in the storage section 34, the echo environment detecting section 40 acquires the adjustment parameter corresponding to this reference echo tap coefficient from the storage section 34 and outputs the adjustment parameter. The reference echo tap coefficient is an example of a reference signal. The correlation threshold value is a value for determining the correlation between the echo tap value and the reference echo tap value. The echo environment detecting section 40 uses a correlation function to calculate a correlation coefficient, which is an example of the correlation between the echo tap coefficient and the reference echo tap coefficient. The correlation coefficient C is calculated using the correlation function shown below, for example.

$$C = \Sigma\{X(t) \times Y(t)\} / \{\Sigma X(t)^2 \times \Sigma Y(t)^2\}^{1/2}$$

Here, X(t) is the echo tap coefficient and Y(t) is the reference echo tap coefficient.

The echo environment detecting section 40 may compare the correlation threshold value to the correlation between the echo tap coefficient calculated over the entire tap bandwidth and the reference echo tap coefficient, to acquire the adjustment parameter. As another example the echo environment detecting section 40 may acquire the adjustment parameter by comparing the correlation threshold value to the correlation between the echo tap coefficient calculated in a predetermined tap bandwidth and the reference echo tap coefficient. The predetermined tap bandwidth is preferably a tap bandwidth that is significantly different from the echo of the ring-tone, according to the surrounding environment. In this way, the echo environment detecting section 40 can easily determine the correlation between the echo tap coefficient and the reference echo tap coefficient.

The ring-tone control section 42 is connected to the echo environment detecting section 40 and the ring-tone producing section 24. The ring-tone control section 42 adjusts and outputs the sound output signal of the ring-tone input from the ring-tone producing section 24, according to the adjustment parameter input from the echo environment detecting section 40. For example, the ring-tone control section 42 enhances a predetermined frequency component of the sound output signal more than other frequency components thereof, according to the adjustment parameter. The enhanced frequency component is set in consideration of a frequency band with a strong sound passing ability, a frequency band that travels a long distance, or the like. The ring-tone control section 42 enhances a low frequency component in the sound output signal more than a high frequency component, according to the adjustment parameter.

The D/A converting section 28 is connected to the adjusting section 26 and the ring-tone control section 42. The D/A converting section 28 performs an analog conversion on the digital sound output signal input from the ring-tone control section 42, and outputs the resulting analog signal to the sound output section 14.

The A/D converting section 30 is an example of a sound acquiring section that acquires the sound input signal generated from external sound. The A/D converting section 30 is connected to the sound input section 16. The A/D converting section 30 performs a digital conversion on the analog sound input signal input from the sound input section 16, and outputs the resulting digital signal.

The echo cancelling section 32 generates the echo tap coefficient corresponding to the echo of the ring-tone output from the sound output section 14, based on the sound input signal and the sound output signal. The echo cancelling section 32 cancels out the echo component of the ring-tone, by subtracting a simulated echo signal calculated based on the echo tap coefficient from the sound input signal of the external sound input from the sound input section 16, and outputs the resulting signal. The echo cancelling section 32 includes an adaptation filter 44 and a subtractor 43.

The subtractor 43 is connected to the A/D converting section 30 and the adaptation filter 44. The subtractor 43 performs cancellation by subtracting the simulated echo signal input from the adaptation filter 44 from the sound input signal input from the A/D converting section 30, to generate a subtraction result signal. The subtractor 43 is connected the I/O section 12 and the adaptation filter 44. The subtractor 43 outputs the subtraction result signal to the adaptation filter 44.

The adaptation filter 44 is an FIR (Finite Impulse Response) filter, for example. The adaptation filter 44 is connected to the adjusting section 26 and the ring-tone control section 42. The adaptation filter 44 updates the echo tap coefficient using a prescribed adaptation algorithm, and outputs the updated echo tap coefficient to the echo environment detecting section 40 of the adjusting section 26. Here, the echo tap coefficient is an example of a response signal, which is a filter coefficient of the adaptation filter 44. Furthermore, the adaptation filter 44 generates the simulated echo signal from the echo tap coefficient and the product of the sound output signal and the echo gain $\beta$, and outputs the simulated echo signal to the subtractor 43.

Upon receiving the subtraction result signal from which the echo component has been cancelled out from the subtractor 43 as feedback, the adaptation filter 44 changes the magnitude of the echo gain $\beta$. In this way, the adaptation filter 44 changes the echo tap coefficient according to the echo remaining in the subtraction result signal. Upon receiving the subtraction result signal from the subtractor 43 as feedback, the adaptation filter 44 may change the timing at which the echo tap coefficient is updated.

The storage section 34 stores the information needed to control the control apparatus 18. For example, the storage section 34 stores the predetermined reference echo tap coefficient in order to make the comparison with the echo tap coefficient. The storage section 34 stores the adjustment parameter. The adjustment parameter is set according to the reference echo tap coefficient, and is a value that is used when the adjusting section 26 adjusts the ring-tone. The storage section 34 stores the correlation threshold value for determining the correlation between the echo tap coefficient and the reference echo tap coefficient.

Figure 2:
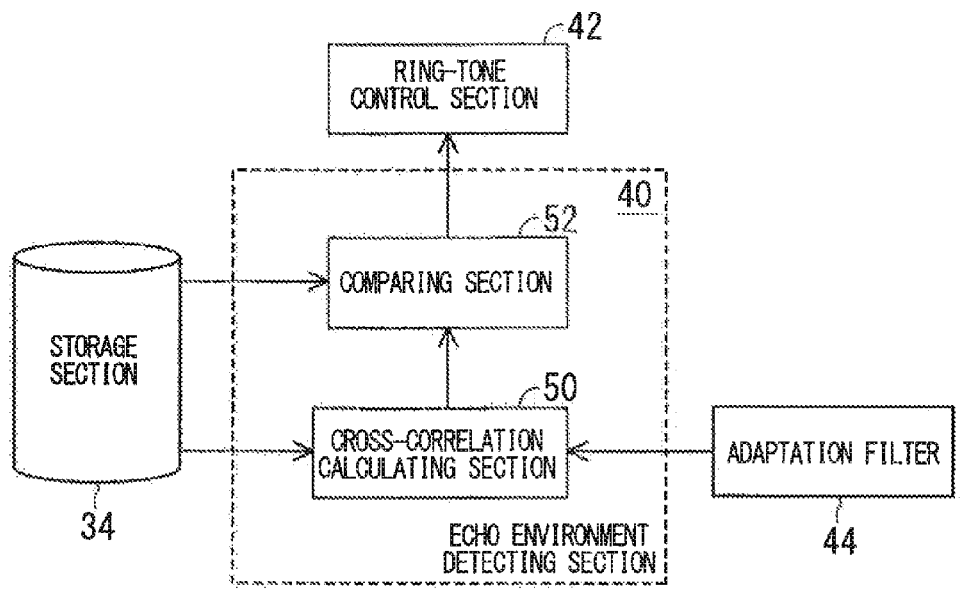
FIG. 2 shows the configuration of the echo environment detecting section 40.

FIG. 2 shows the configuration of the echo environment detecting section 40. As shown in FIG. 2, the echo environment detecting section 40 includes a cross-correlation coefficient calculating section 50 and a comparing section 52.

The cross-correlation coefficient calculating section 50 is connected to the adaptation filter 44 and the storage section 34. The cross-correlation coefficient calculating section 50 calculates the correlation coefficient between the echo tap coefficient input from the adaptation filter 44 and the reference echo tap coefficient acquired from the storage section 34, according to a correlation function, and outputs the correlation coefficient.

The comparing section 52 is connected to the cross-correlation coefficient calculating section 50 and the storage section 34. The comparing section 52 compares the correlation coefficient input from the cross-correlation coefficient calculating section 50 to the correlation threshold value stored in the storage section 34. When it is determined that the correlation coefficient is greater than or equal to the correlation threshold value, the comparing section 52 acquires from the storage section 34 the adjustment parameter corresponding to the reference echo tap coefficient used when calculating this correlation coefficient, and outputs the adjustment parameter to the ring-tone control section 42.

Figure 3:
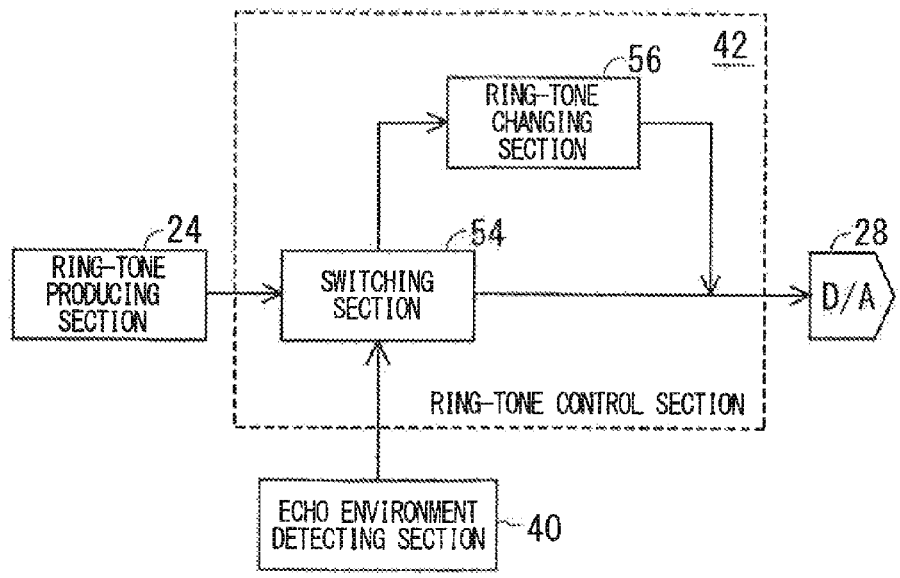
FIG. 3 shows the configuration of the ring-tone control section 42.

FIG. 3 shows the configuration of the ring-tone control section 42. As shown in FIG. 3, the ring-tone control section 42 includes a switching section 54 and a ring-tone changing section 56.

The switching section 54 is connected to the echo environment detecting section 40. The switching section 54 determines whether it is necessary to adjust the sound output signal of the ring-tone, according to whether the adjustment parameter is input from the echo environment detecting section 40. In a case where the adjustment parameter is not input, the switching section 54 determines that it is not necessary to adjust the sound output signal of the ring-tone. In this case, the switching section 54 outputs the sound output signal of the reception signal input from the ring-tone producing section 24 as-is to the D/A converting section 28. On the other hand, in a case where the adjustment parameter is input, the switching section 54 determines that it is necessary to adjust the sound output signal of the ring-tone. In this case, the switching section 54 outputs the sound output signal of the ring-tone input from the ring-tone producing section 24 to the D/A converting section 28, and also outputs the adjustment parameter together with the sound output signal of the ring-tone to the ring-tone changing section 56.

When the sound output signal of the ring-tone and the adjustment parameter are both input from the switching section 54, the ring-tone changing section 56 performs adjustment by changing the sound output signal according to the adjustment parameter. The ring-tone changing section 56 outputs the adjusted sound output signal to the D/A converting section 28. In this way, when the adjustment parameter is input, the ring-tone control section 42 outputs to the D/A converting section 28 a sound output signal resulting from the combination of the adjusted sound output signal and the sound output signal input as-is from the ring-tone producing section 24. The ring-tone changing section 56 includes a DSP (Digital Signal Processor) such as an equalizer, for example. The ring-tone changing section 56 may be an amplifier with variable gain that changes according to the adjustment parameter.

Figure 4:
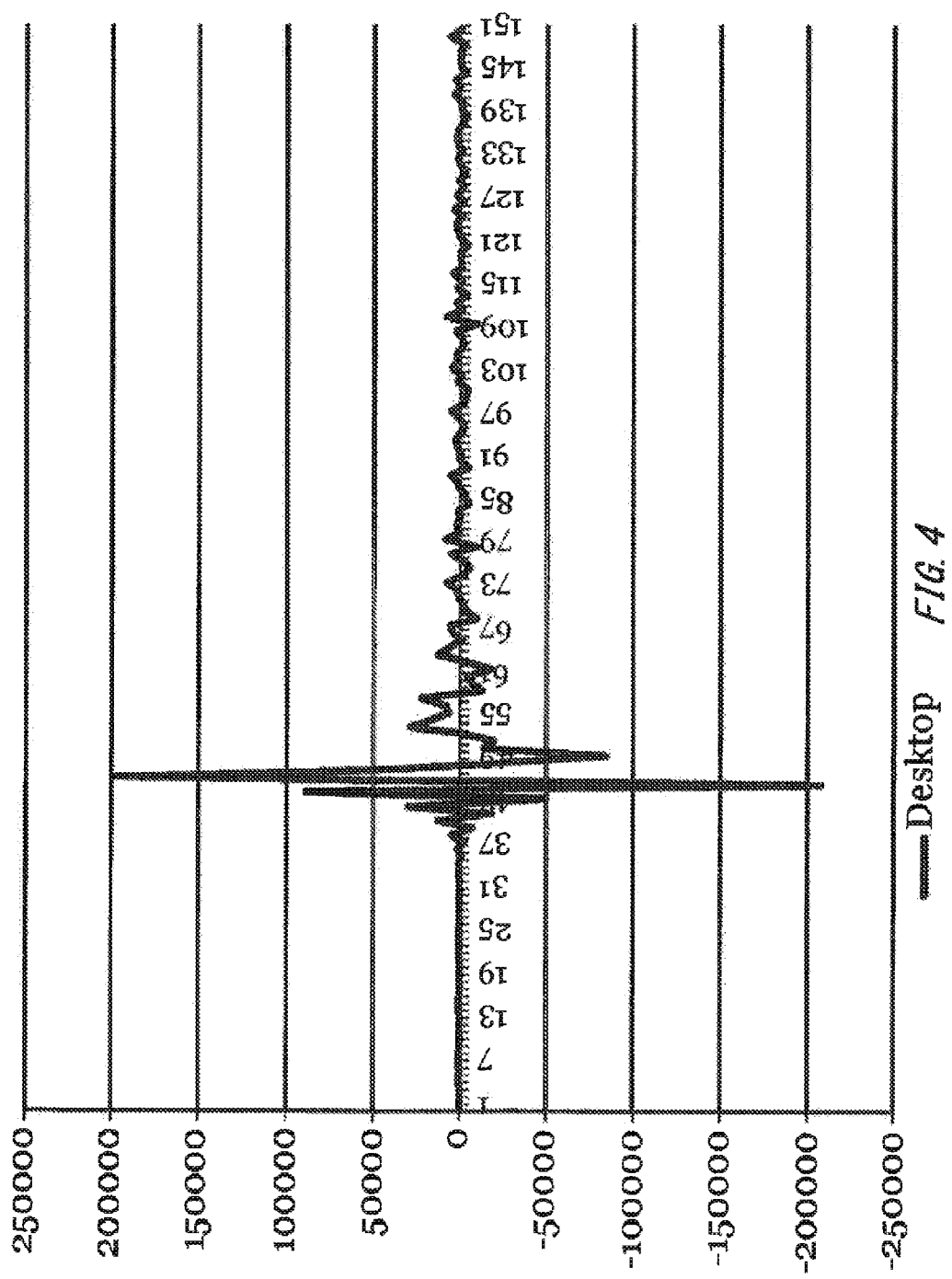
FIG. 4 is used to describe an echo tap coefficient.
Figure 5:
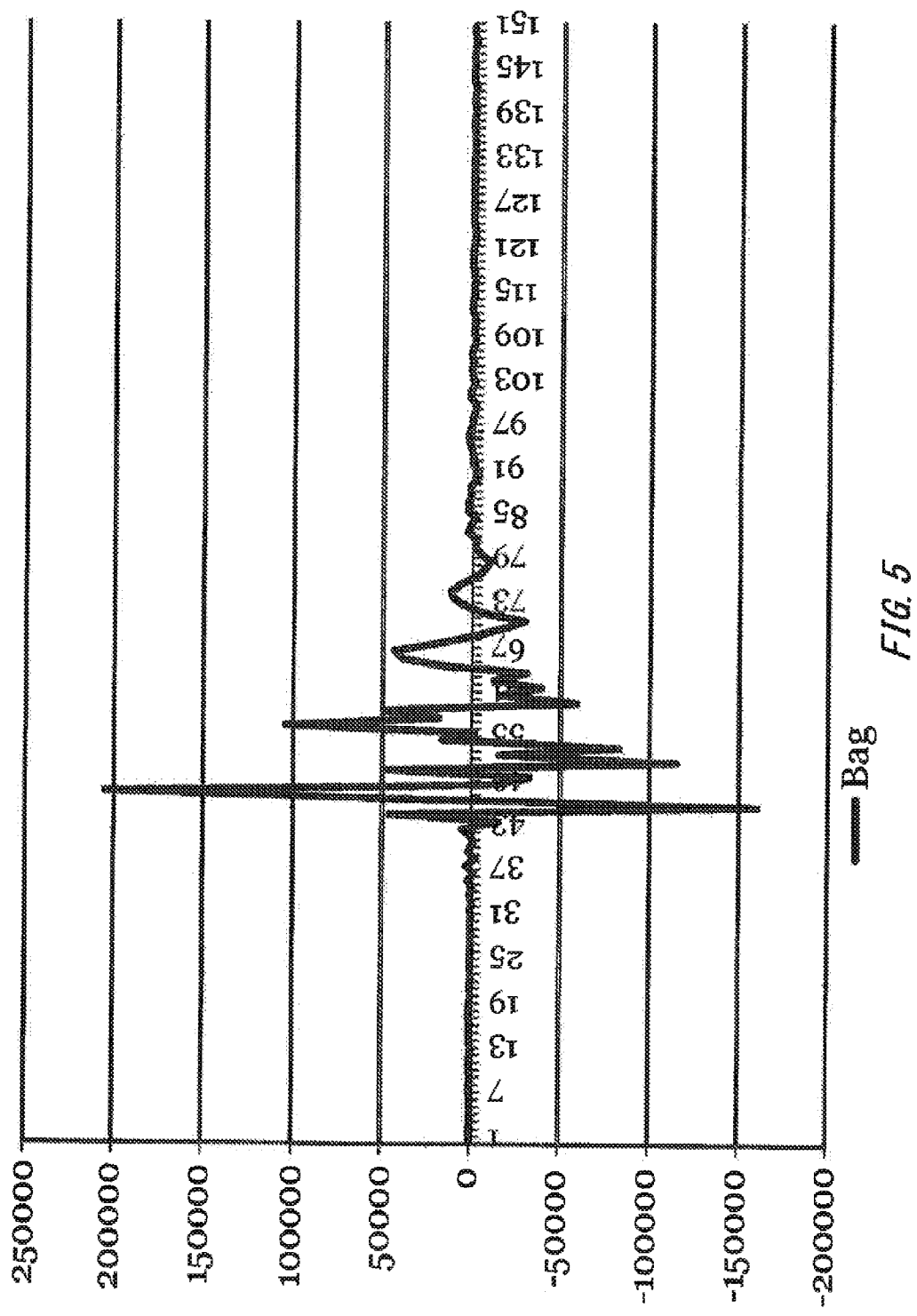
FIG. 5 is used to describe an echo tap coefficient.

FIGS. 4 and 5 are used to describe the echo tap coefficient. In FIGS. 4 and 5, the horizontal axes indicate time and the vertical axes indicate the strength of the coefficient. FIG. 4 shows an example of the echo tap coefficient in a state (referred to hereinafter as state A1) where the electronic apparatus 10 is placed in an uncovered environment, such as on a desk. FIG. 5 shows an example of the echo tap coefficient in a state (referred to hereinafter as state A2) where the electronic apparatus 10 is placed in a covered environment, such as in a bag.

As shown in FIGS. 4 and 5, the echo tap coefficient differs between states A1 and A2. Accordingly, the control apparatus 18 can identify the surrounding environment and adjust the ring-tone by storing information corresponding to each echo tap coefficient as reference echo tap coefficients.

The control apparatus 18 stores a reference echo tap coefficient corresponding to the echo tap coefficient of state A2 shown in FIG. 5 in the storage section 34, for example. The adaptation filter 44 generates the echo tap coefficient such that a greater amount of the echo of the reception signal is cancelled out from the subtraction result signal input from the subtractor 43. Accordingly, when the electronic apparatus 10 is placed in a bag or the like, the adaptation filter 44 generates the simulated echo signal that resembles the reference echo tap coefficient shown in FIG. 5. In this way, the correlation coefficient P1 between the echo tap coefficient and the reference echo tap coefficient becomes larger. On the other hand, when the electronic apparatus 10 is placed on a desk, for example, the adaptation filter 44 generates the simulated echo signal resembling the reference echo tap coefficient shown in FIG. 4. Accordingly, the correlation coefficient P2 between the echo tap coefficient and the reference echo tap coefficient becomes smaller. By setting the correlation threshold value to be a value between the correlation coefficient P1 and the correlation coefficient P2, the comparing section 52 of the echo cancelling section 32 can determine the surrounding environment and determine whether it is necessary to output the adjustment parameter to the ring-tone control section 42.

Figure 6:
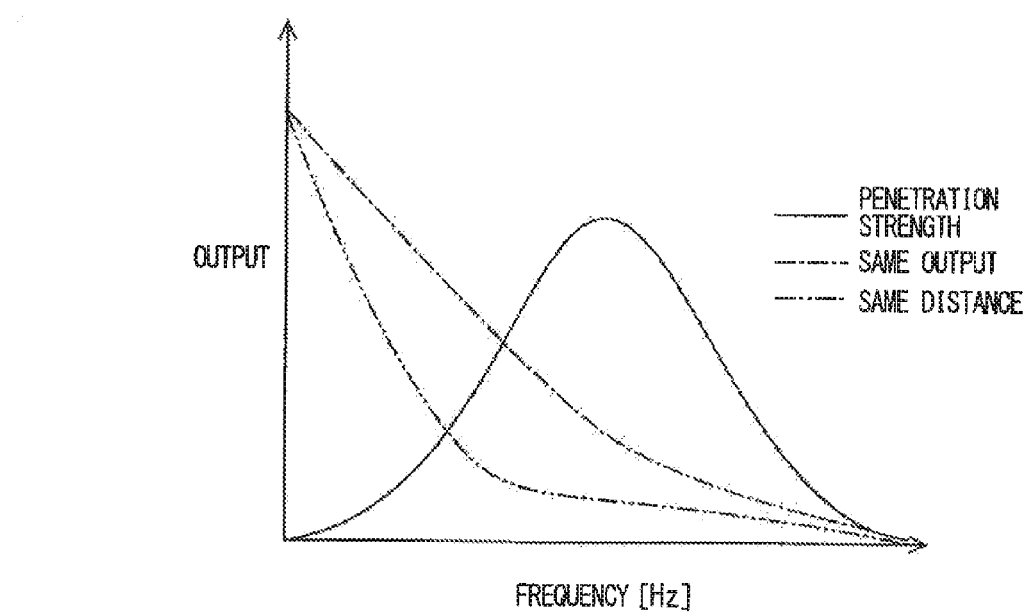
FIG. 6 shows the relationship between frequency and sound.

FIG. 6 shows the relationship between frequency and sound. In FIG. 6, the horizontal axis indicates frequency and the vertical axis indicates the sound output. Furthermore, the solid line indicates the penetration strength of sound relative to physical matter, the single-dashed line indicates the output efficiency, and the double-dashed line indicates the output at the same distance. Each line indicates output with the same electrical power.

As shown in FIG. 6, the penetration strength reaches a maximum value near the middle of the audible frequency band, e.g. at approximately 1000 Hz. The output efficiency and output at the same distance decrease as the frequency increases. Here, the penetration strength and the output at the same distance are important parameters for the ring-tone. Accordingly, the penetration strength and output at the same distance are ideally both high frequencies. In other words, the ring-tone is preferably formed by a sound in which the multiplicative effect of the penetration strength and the output at the same distance is at the highest frequency, e.g. a frequency of approximately 500 Hz where the penetration strength and the output at the same distance intersect.

Figure 7:
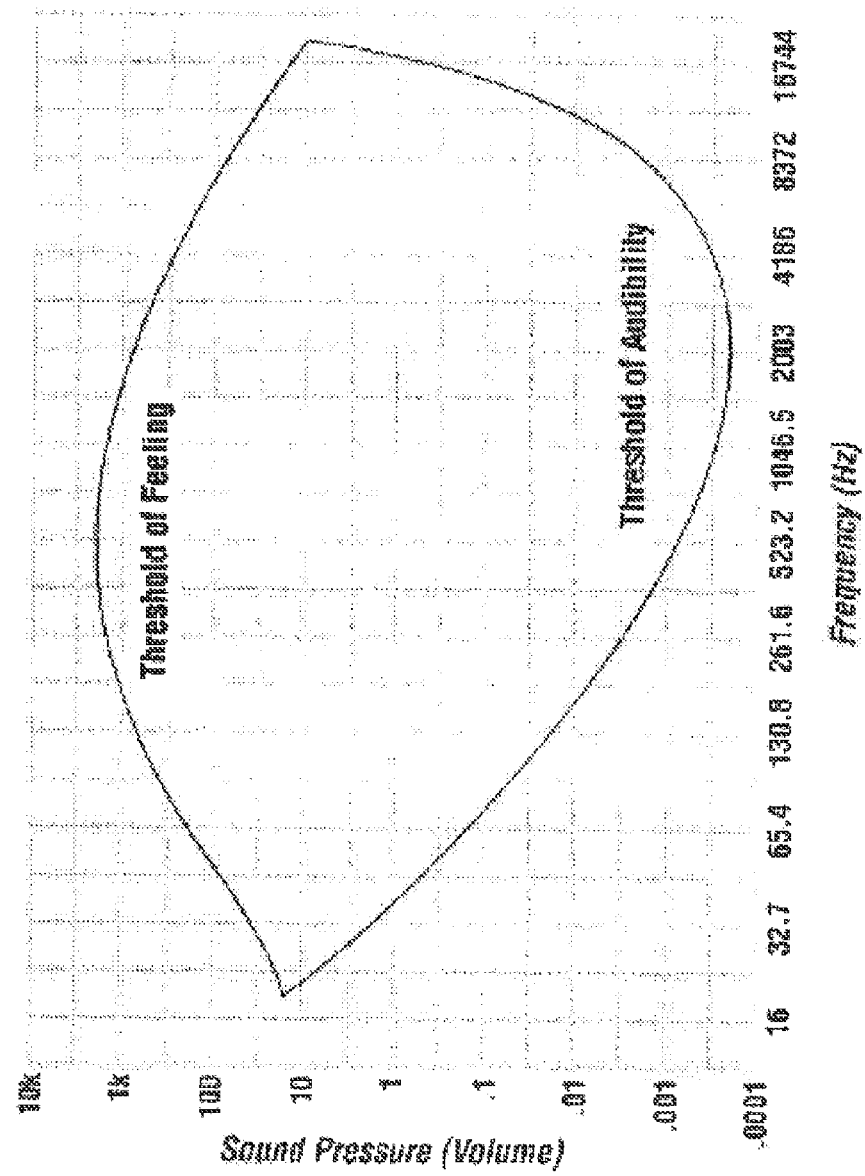
FIG. 7 is used to describe sound in the audible range for humans.

FIG. 7 is used to describe sound in the audible range for humans. In FIG. 7, the horizontal axis indicates frequency and the vertical axis indicates sound pressure, i.e. volume. The region surrounded by the solid lines in FIG. 7 is the audible sound range for humans. As shown in FIG. 7, a person can hear sounds in a frequency range from 500 Hz to 5 kHz more easily than sounds with other frequencies.

Figure 8:
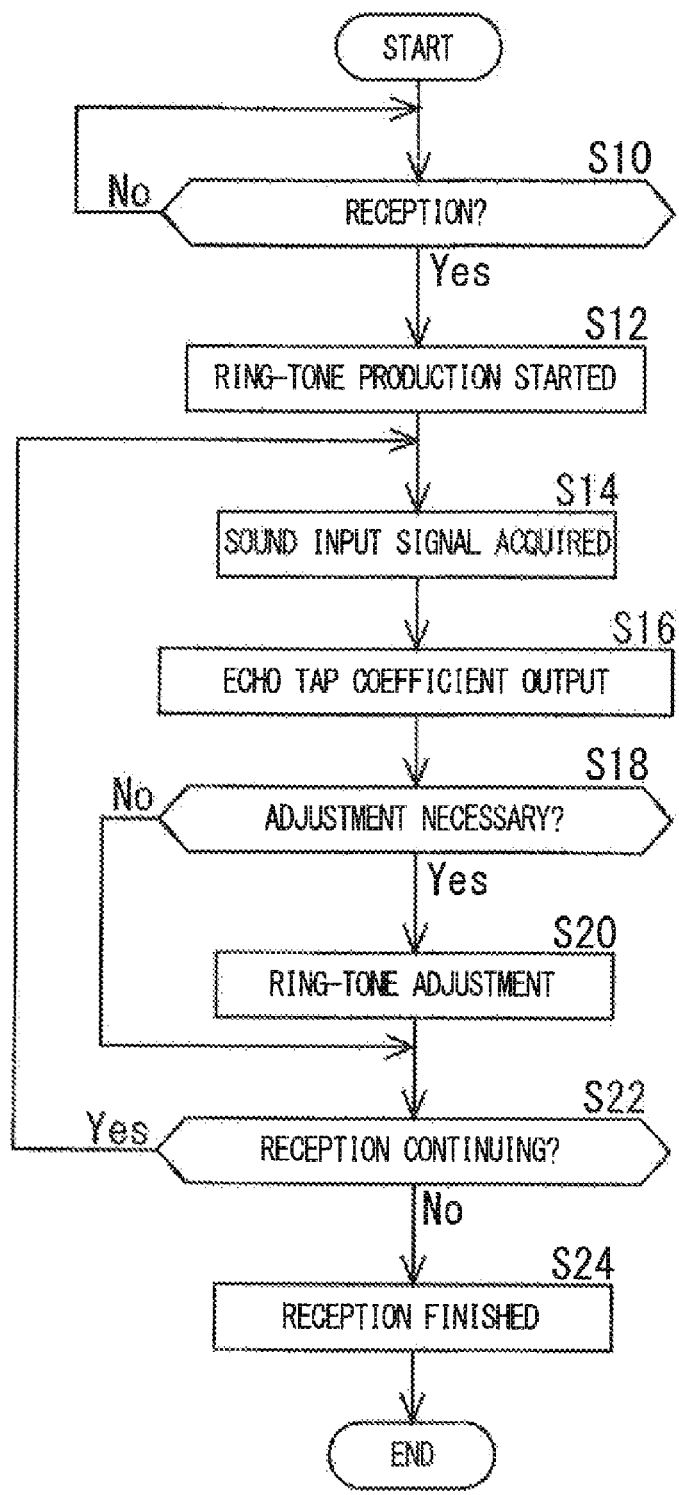
FIG. 8 is a flow chart of the ring-tone control process performed by the control apparatus 18.

FIG. 8 is a flow chart of the ring-tone control process performed by the control apparatus 18.

As shown in FIG. 8, the reception detecting section 22 determines whether something has been received, based on the reception signal input from the I/O section 12 (S10). The reception detecting section 22 remains in a standby state (S10: No) until the reception signal is input. When the reception signal is input, the reception detecting section 22 determines that something has been received (S10: Yes), and outputs the detection signal to the ring-tone producing section 24.

When the detection signal is input, the ring-tone producing section 24 outputs the ring-tone (S12). Specifically, when the detection signal is input, the ring-tone producing section 24 outputs the sound output signal of the ring-tone to the ring-tone control section 42 of the adjusting section 26. In this state, the echo environment detecting section 40 is not outputting the adjustment parameter, and therefore the ring-tone control section 42 outputs the sound output signal of the ring-tone to the sound output section 14 via the D/A converting section 28, according to the volume setting from the user. In this way, the sound output section 14 outputs the ring-tone.

When the surrounding sound and the ring-tone output by the sound output section 14 are input to the sound input section 16, the A/D converting section 30 acquires the sound input signal, which is an electrical signal generated from external sound including the ring-tone by the sound input section 16 (S14). The A/D converting section 30 outputs the acquired sound input signal to the subtractor 43.

The adaptation filter 44 of the echo cancelling section 32 updates the echo tap coefficient and outputs the updated echo tap coefficient to the adjusting section 26 (S16). Furthermore, the adaptation filter 44 outputs the generated simulated echo signal to the subtractor 43. As a result, the subtractor 43 outputs to the adaptation filter 44 the subtraction result signal obtained by subtracting the simulated echo signal from the sound input signal input thereto. In a case where the echo portion is not cancelled out from the input sound input signal, the adaptation filter 44 updates the echo tap coefficient when performing step S16 again.

Next, the adjusting section 26 determines whether adjustment is necessary, based on the echo tap coefficient input from the adaptation filter 44 (S18). Specifically, in the echo environment detecting section 40 of the adjusting section 26, the cross-correlation coefficient calculating section 50 calculates the correlation coefficient between the echo tap coefficient input from the adaptation filter 44 and the reference echo tap coefficient stored in the storage section 34. When the correlation coefficient is greater than or equal to the correlation threshold value, the comparing section 52 outputs the adjustment parameter corresponding to this reference echo tap coefficient to the ring-tone control section 42.

In the ring-tone control section 42, in a case where the adjustment parameter is not input from the comparing section 52 of the echo environment detecting section 40, the switching section 54 determines that adjustment of the ring-tone is not necessary (S18: No) and outputs to the D/A converting section 28 the sound output signal of the ring-tone input from the ring-tone producing section 24. In other words, the ring-tone control section 42 outputs the sound output signal of the ring-tone to the sound output section 14 via the D/A converting section 28, without adjusting the sound output signal.

On the other hand, when the adjustment parameter is input from the comparing section 52, the switching section 54 determines that adjustment of the ring-tone is necessary (S18: Yes), outputs the sound output signal of the ring-tone in a state unaltered from when the sound output signal was input from the ring-tone producing section 24 to the D/A converting section 28, and outputs to the ring-tone changing section 56 the sound output signal of the ring-tone and the adjustment parameter input from the comparing section 52.

When the adjustment parameter and the sound output signal of the ring-tone are input from the switching section 54, the ring-tone changing section 56 adjusts the sound output signal according to the adjustment parameter (S20). The ring-tone changing section 56 outputs to the sound output section 14 the adjusted sound output signal and the sound output signal of the ring-tone that is unaltered from when the ring-tone was input from the ring-tone producing section 24, via the ring-tone producing section 24. In this way, the sound output section 14 outputs the ring-tone based on the sound output signal adjusted according to the surrounding environment.

After this, the reception detecting section 22 determines whether reception continues, based on whether there is a reception signal input from the I/O section 12 (S22). The reception detecting section 22 determines that reception is continuing while the input of the reception signal continues (S22: Yes), and repeats the steps from step S14.

On the other hand, when the input of the reception signal stops, the reception detecting section 22 determines that reception has ended (S22: No), and stops the output of the detection signal. The ending of the reception includes both the end of reception from the remote terminal and the beginning of conversation with the remote terminal.

When the input of the detection signal from the reception detecting section 22 stops, the ring-tone producing section 24 stops the output of the sound output signal of the ring-tone, and ends the output of the ring-tone (S24).

As described above, with the control apparatus 18 of the electronic apparatus 10, the ring-tone is adjusted according to the sound input signal in a state where a known ring-tone output by the electronic apparatus 10 is being generated. In this way, the control apparatus 18 determines the surrounding environment according to the sound input signal resulting from the known ring-tone and adjusts the ring-tone, and therefore the control apparatus 18 can appropriately change the ring-tone that is output according to the surrounding environment, and can therefore reliably notify the user with the ring-tone.

Furthermore, the control apparatus 18 adjusts the ring-tone using an echo tap coefficient corresponding to the echo of the ring-tone, and can therefore further adjust the ring-tone according to the surrounding environment.

Figure 9:
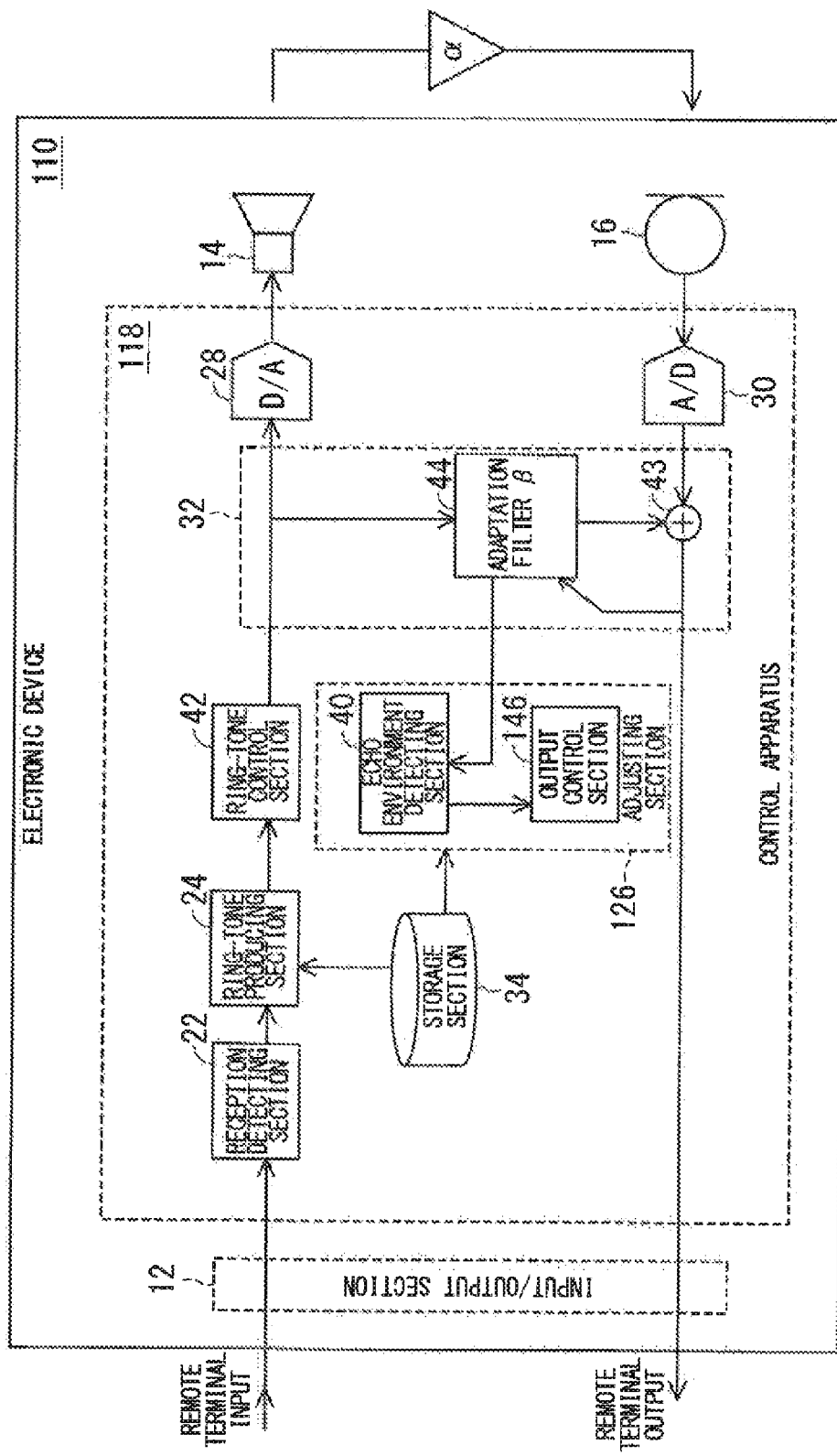
FIG. 9 shows an overall configuration of an electronic apparatus 110 including a control apparatus 118 according to another embodiment.

FIG. 9 shows an overall configuration of an electronic apparatus 110 including a control apparatus 118 according to another embodiment.

As shown in FIG. 9, the adjusting section 126 of the control apparatus 118 of the electronic apparatus 110 adjusts the output of an output device according to the sound input signal obtained in a state where the ring-tone is being generated. The adjusting section 126 includes an output control section 146. The output control section 146 is connected to the echo environment detecting section 40. When the adjustment parameter is input from the echo environment detecting section 40, the output control section 146 wirelessly transmits the adjustment parameter to another electronic apparatus. For example, the output control section performs wireless transmission using Bluetooth (Registered Trademark).

Figure 10:
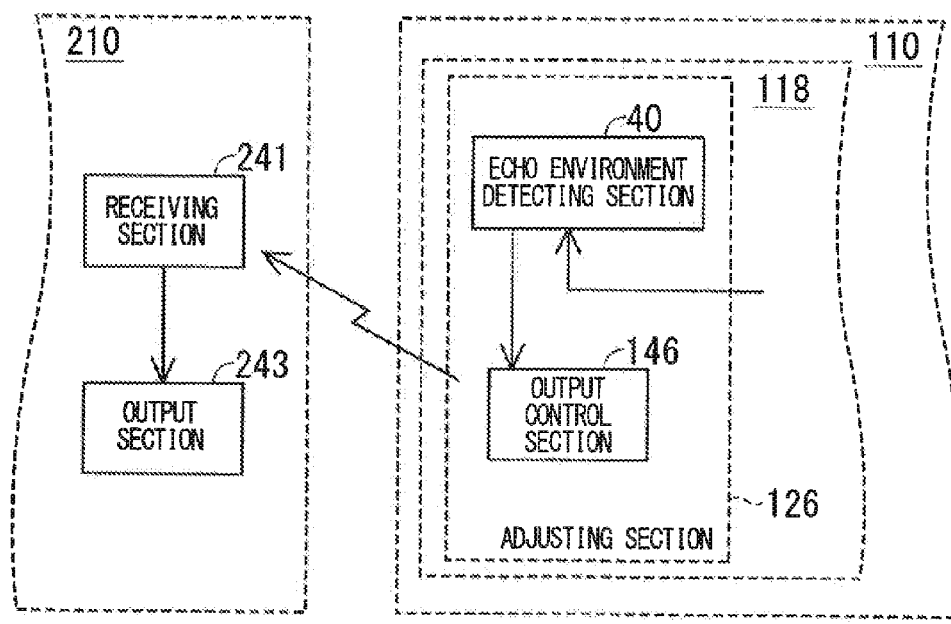
FIG. 10 shows a configuration of an output device 210 and the electronic apparatus 110 shown in FIG. 9.

FIG. 10 shows a configuration of an output device 210 and the electronic apparatus 110 shown in FIG. 9. The output device 210 is a headset, for example. The output device 210 includes a receiving section 241 and an output section 243.

When the adjustment parameter is received from the output control section 146, the receiving section 241 outputs the adjustment parameter to the output section 243.

The output section 243 includes a vibration motor and causes the output device 210 to vibrate, for example. When the adjustment parameter is input from the receiving section 241, the output section 243 performs control to adjust the amplitude of the vibration or the period of the vibration of the vibration motor, according to the adjustment parameter.

Instead of using Bluetooth (Registered Trademark) to perform the wireless communication, the output control section 146 may use wired communication. In this case, the receiving section 241 receives the adjustment parameter from the output control section 146 using wired communication. Instead of a vibration motor, the output section 243 may include a speaker. In this case, when the adjustment parameter is input from the receiving section 241, the output section 243 adjusts the volume, frequency, or the like of the sound output from the speaker, according to the adjustment parameter. Instead of the vibration motor, the output section 243 may include a light emitting member. In this case, when the adjustment parameter is input from the receiving section 241, the output section 243 adjusts the frequency, luminosity, or the like of the light output from the light emitting member, according to the adjustment parameter.

Figure 11:
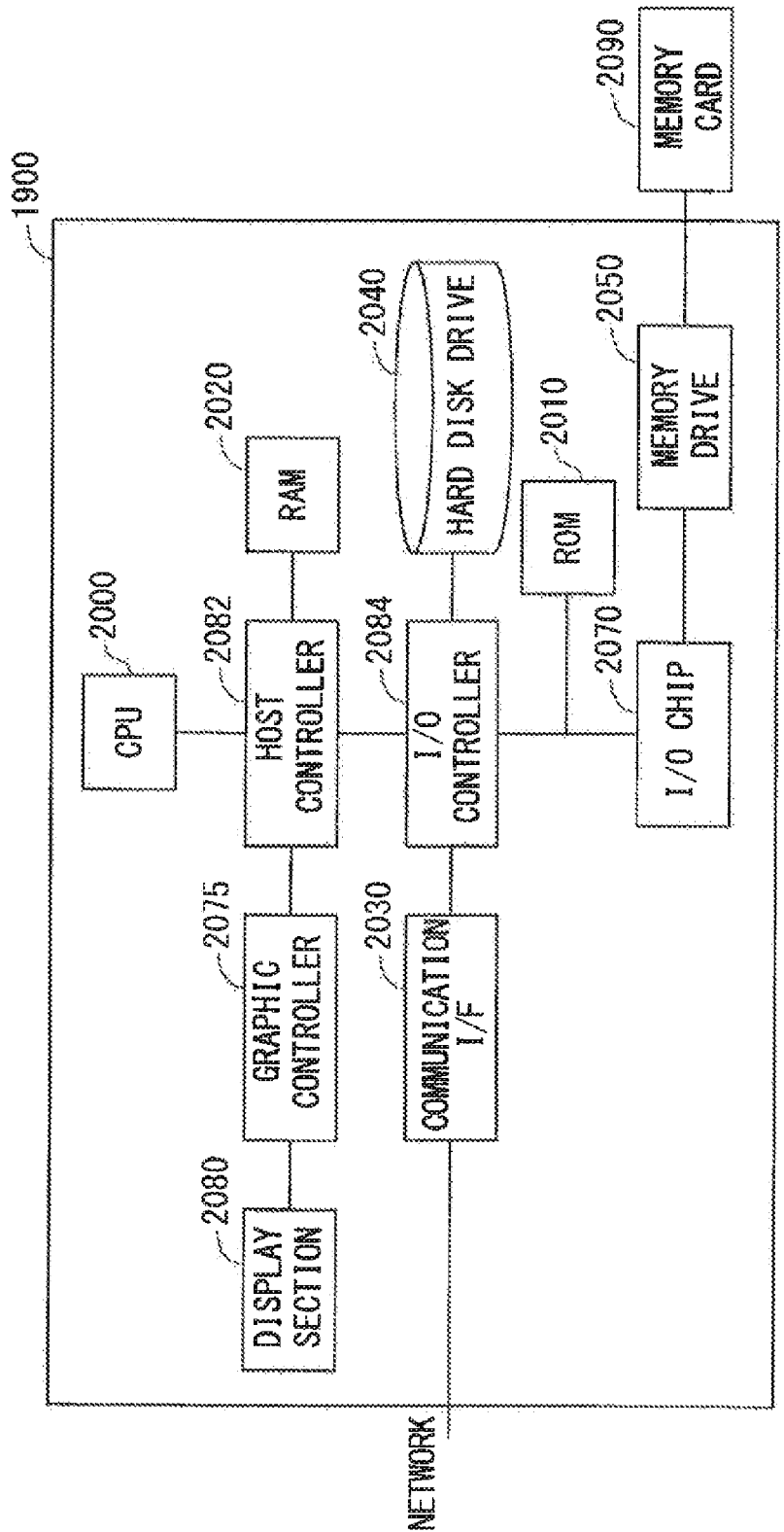
FIG. 11 shows an example of a hardware configuration of a computer 1900 according to the present embodiment.

FIG. 11 shows an example of a hardware configuration of a computer 1900 according to the present embodiment. The computer 1900 according to the present embodiment is an example of a control apparatus and is mounted in a mobile telephone, a smart phone, a tablet, or the like. The computer 1900 is provided with a CPU peripheral including a CPU 2000, a RAM 2020, a graphic controller 2075, and a display apparatus 2080, all of which are connected to each other by a host controller 2082; an input/output section including a communication interface 2030 and a hard disk drive 2040 that are connected to the host controller 2082 by an input/ output controller 2084; and a legacy input/output section including a ROM 2010, a memory drive 2050, and an input/output chip 2070, all of which are connected to the input/output controller 2084.

The host controller 2082 is connected to the RAM 2020 and is also connected to the CPU 2000 and graphic controller 2075 accessing the RAM 2020 at a high transfer rate. The CPU 2000 operates to control each section based on programs stored in the ROM 2010 and the RAM 2020. The graphic controller 2075 acquires image data generated by the CPU 2000 or the like on a frame buffer disposed inside the RAM 2020 and displays the image data in the display apparatus 2080. Instead, the graphic controller 2075 may internally include the frame buffer storing the image data generated by the CPU 2000 or the like.

The input/output controller 2084 connects the communication interface 2030 serving as a relatively high speed input/output apparatus, and the hard disk drive 2040, and the CD-ROM drive 2060 to the host controller 2082. The communication interface 2030 communicates with other apparatuses via a network. The hard disk drive 2040 stores the programs, such as a display program, and data used by the CPU 2000 housed in the computer 1900.

Furthermore, the input/output controller 2084 is connected to the ROM 2010, and is also connected to the memory drive 2050 and the input/output chip 2070 serving as a relatively high speed input/output apparatus. The ROM 2010 stores a boot program performed when the computer 1900 starts up, a program relying on the hardware of the computer 1900, and the like. The memory drive 2050 reads programs or data from a memory card 2090 and supplies the read information to the hard disk drive 2040 via the RAM 2020. The input/output chip 2070 connects the memory drive 2050 to the input/output controller 2084 along with each of the input/output apparatuses via, a parallel port, a serial port, a keyboard port, a mouse port, or the like.

The programs provided to the hard disk drive 2040 via the RAM 2020 are stored in a storage medium, such as the memory card 2090 or an IC card, and provided by a user. The programs are read from storage medium, installed in the hard disk drive 2040 inside the computer 1900 via the RAM 2020, and performed by the CPU 2000.

The programs installed in the computer 1900 to make the computer 1900 function as the control apparatuses 18 and 118 are provided with a sound reproduction module, a sound acquisition module, and an adjustment module. These programs and modules prompt the CPU 2000 or the like to make the computer 1900 function as each of the sound reproduction module, the sound acquisition module, and the adjustment module.

The information processes recorded in these programs are read by the computer 1900 to cause the computer 1900 to function as software and hardware described above, which are exemplified by the specific sections of the sound reproduction module, the sound acquisition module, and the adjustment module. With these specific means, a unique control apparatus 18 or 118 suitable for an intended use can be configured by realizing the calculations or computations appropriate for the intended use of the computer 1900 of the present embodiment.

For example, if there is communication between the computer 1900 and an external apparatus or the like, the CPU 2000 performs the communication program loaded in the RAM 2020, and provides the communication interface 2030 with communication processing instructions based on the content of the process recorded in the communication program. The communication interface 2030 is controlled by the CPU 2000 to read the transmission data stored in the transmission buffer area or the like on the storage apparatus, such as the RAM 2020, the hard disk 2040, or the memory card 2094, and send this transmission data to the network, and to write data received from the network onto a reception buffer area on the storage apparatus. In this way, the communication interface 2030 may transmit data to and from the storage apparatus through DMA (Direct Memory Access). As another possibility, the CPU 2000 may transmit the data by reading the data from the storage apparatus or communication interface 2030 that are the origins of the transmitted data, and writing the data onto the communication interface 2030 or the storage apparatus that are the transmission destinations.

The CPU 2000 may perform various processes on the data in the RAM 2020 by reading into the RAM 2020, through DMA transmission or the like, all or a necessary portion of the database or files stored in the external apparatus such as the hard disk 2040 or the memory drive 2050 (memory card 2090). The CPU 2000 writes the processed data back to the external apparatus through DMA transmission or the like. In this process, the RAM 2020 is considered to be a section that temporarily stores the content of the external storage apparatus, and therefore the RAM 2020, the external apparatus, and the like in the present embodiment are referred to as a memory, a storage section, and a storage apparatus. The variety of information in the present embodiment, such as the variety of programs, data, tables, databases, and the like are stored on the storage apparatus to become the target of the information processing. The CPU 2000 can hold a portion of the RAM 2020 in a cache memory and read from or write to the cache memory. With such a configuration as well, the cache memory serves part of the function of the RAM 2020, and therefore the cache memory is also included with the RAM 2020, the memory, and/or the storage apparatus in the present invention, except when a distinction is made.

The CPU 2000 executes the various processes such as the computation, information processing, condition judgment, searching for/replacing information, and the like included in the present embodiment for the data read from the RAM 2020, as designated by the command sequence of the program, and writes the result back onto the RAM 2020. For example, when performing condition judgment, the CPU 2000 judges whether a variable of any type shown in the present embodiment fulfills a condition of being greater than, less than, no greater than, no less than, or equal to another variable or constant. If the condition is fulfilled, or unfulfilled, depending on the circumstances, the CPU 2000 branches into a different command sequence or acquires a subroutine. The CPU 2000 can search for information stored in a file in the storage apparatus, the database, and the like.

The programs and modules shown above may also be stored in an external storage medium. The memory card 2090, an optical storage medium such as a DVD or CD, a magneto-optical storage medium such as an MO, a tape medium, a semiconductor memory such as an IC card, or the like can be used as the storage medium. Furthermore, a storage apparatus such as a hard disk or RAM that is provided with a server system connected to the Internet or a specialized communication network may be used to provide the programs to the computer 1900 via the network.

The functions, connection relationship, arrangement, numerical values such as the number of components, and the like for each configuration described above in the present embodiment may be altered as desired. Furthermore, each of the embodiments may be used in combination.

For example, in the embodiment described above, the ring-tone is adjusted based on the correlation between the echo tap coefficient and one reference echo tap coefficient, but instead, the ring-tone may be adjusted based on the correlation between the echo tap coefficient and a plurality of reference echo tap coefficients. In this case, the adjusting section 26 adjusts the reception using the adjustment parameter corresponding to the reference echo tap coefficient that has the highest correlation with the echo tap coefficient, from among the plurality of echo tap coefficients. The adjusting section 26 need only adjust the ring-tone in a case where the correlation coefficient between the echo tap coefficient and the reference echo tap coefficient having the highest correlation is greater than or equal to the correlation threshold value. In this case, the adjusting section 26 does not adjust the ring-tone in a case where the correlation coefficient between the echo tap coefficient and the reference echo tap coefficient having the highest correlation is less than the correlation threshold value.

Figure 12:
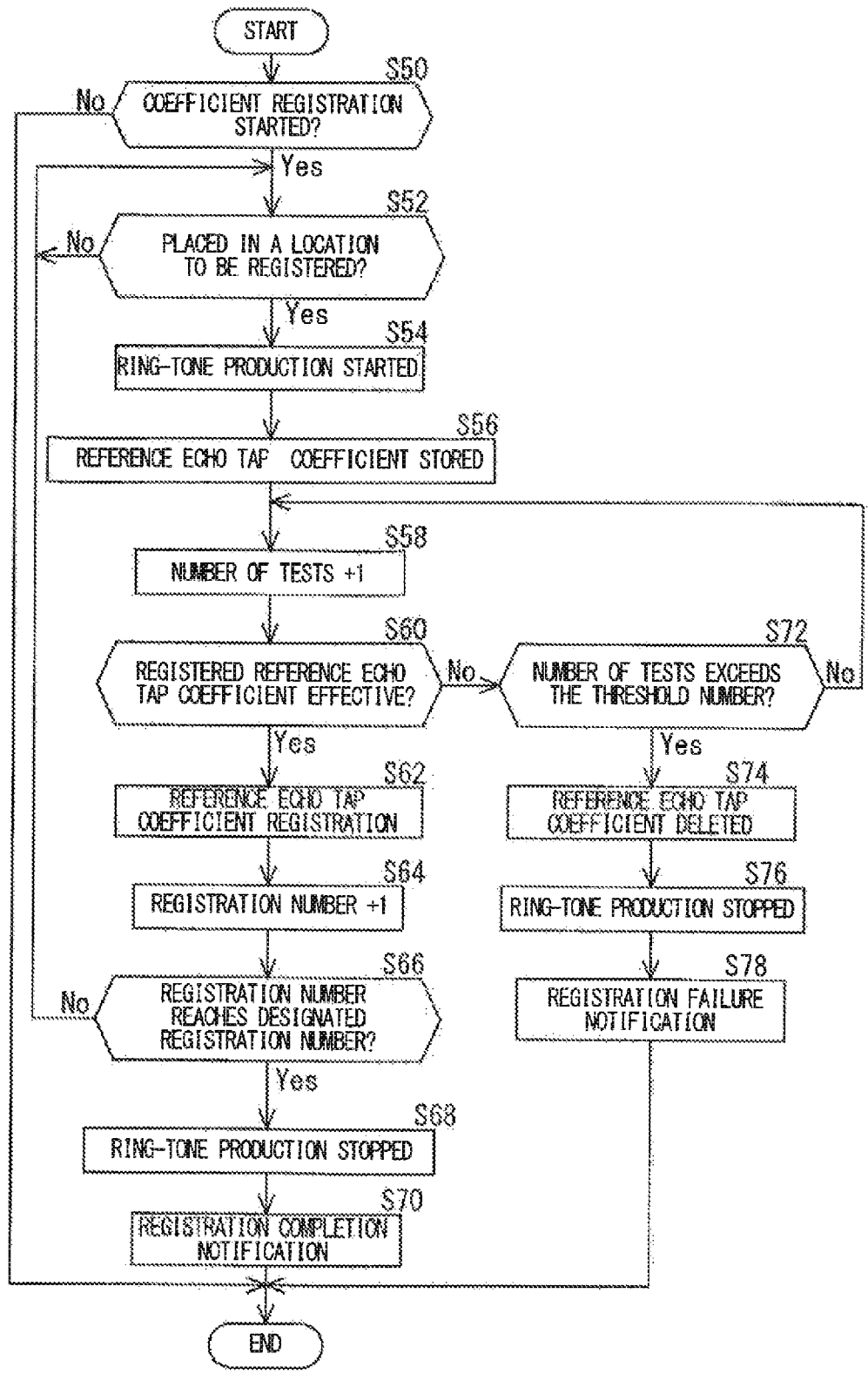
FIG. 12 is a flow chart showing a process to register reference echo tap coefficients performed by the control apparatus 18 of the electronic apparatus 10.
Figure 13A:
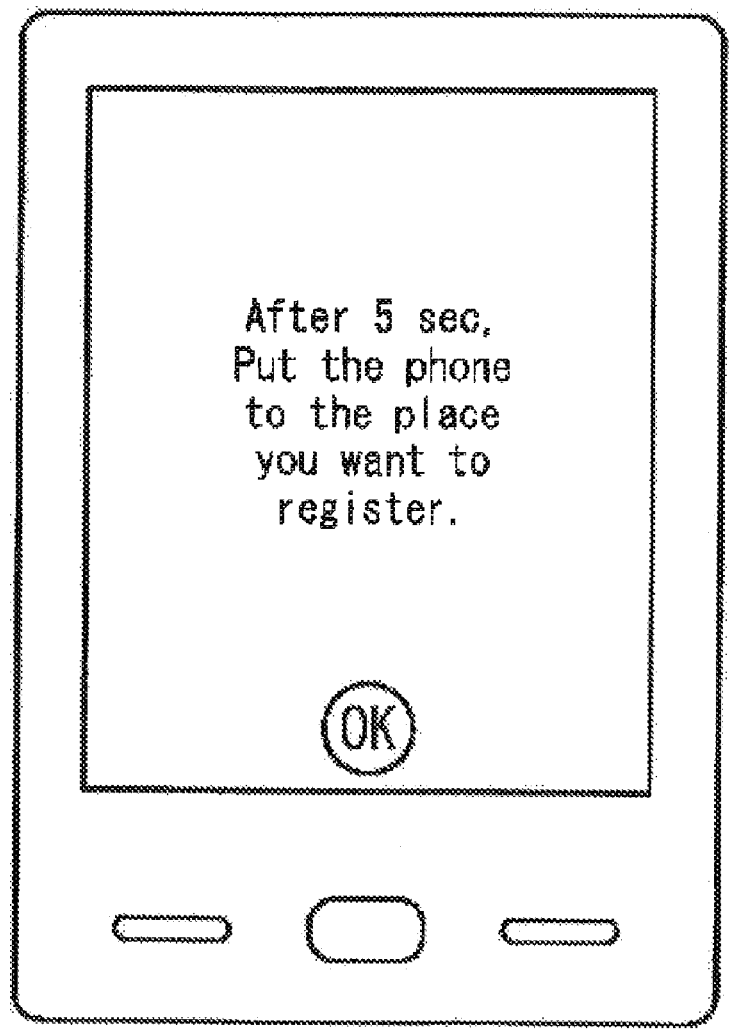
FIGS. 13A-D describe the reference echo tap coefficient registration process performed by the control apparatus 18.
Figure 13D:
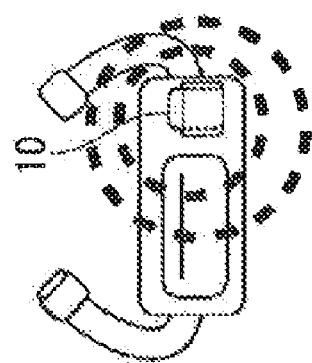
Figure 13C:
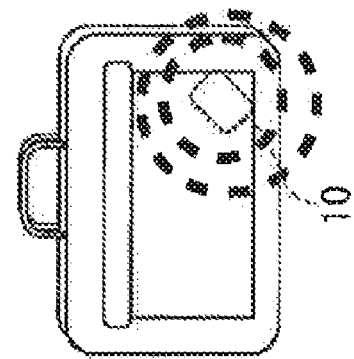
Figure 13B:
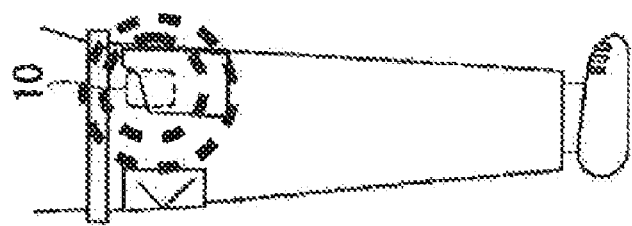

FIG. 12 is a flow chart showing a process to register reference echo tap coefficients performed by the control apparatus 18 of the electronic apparatus 10.

As shown in FIG. 12, when the echo environment detecting section 40 receives an instruction to start the reference echo tap coefficient registration via the I/O section 12 (S50: Yes), the reference echo tap registration mode is entered and information indicating that registration will begin in five seconds is displayed in the display screen of the electronic apparatus 10. The echo environment detecting section 40 determines that the electronic apparatus 10 is placed in a certain environment (S52: Yes) and then, when five seconds have passed since this determination, the ring-tone control section 42 begins producing the ring-tone (S54). The echo environment detecting section 40 generates a tentative reference echo tap coefficient, stores this reference echo tap coefficient in the storage section 34 (S56), and increments the number of tests by +1 (S58).

The echo environment detecting section 40 determines whether the stored reference echo tap coefficient is effective (S60). When the reference echo tap coefficient is determined to be effective (S60: Yes), the echo environment detecting section 40 officially registers this reference echo tap coefficient in the storage section 34 (S62). The echo environment detecting section 40 increments the registration number, which is the number of registered reference echo tap coefficients, by +1 (S64). The echo environment detecting section 40 determines whether the registration number has reached a designated registration number (S66). The designated registration number may be designated by the user, or may be designated as an initial value.

When it is determined that the registration number has reached the designated registration number (S66: Yes), the echo environment detecting section 40 outputs this information to the ring-tone control section 42. The ring-tone control section 42 stops the production of the ring-tone (S68), provides notification of registration completion on the display screen (S70), and ends the reference echo tap coefficient registration process.

On the other hand, when it is determined that the registration number has not reached the designated registration number (S66: No), the echo environment detecting section 40 repeats the steps from step S52. At the following step S54, if the ring-tone is already being produced, the ring-tone control section 42 continues producing the ring-tone.

At step S60, when it is determined that the stored reference echo tap coefficient is ineffective (S60: No), the echo environment detecting section 40 determines whether the number of tests exceeds a threshold number (S72). This threshold number may be designated by the user, or may be set as an initial value. When it is determined that the number of tests does not exceed the threshold number (S72: No), the echo environment detecting section 40 repeats step S58. On the other hand, when it is determined that the number of tests does exceed the threshold number (S72: Yes), this means it is likely that the registered echo tap coefficient is an error, and so the echo environment detecting section 40 deletes this stored reference echo tap coefficient and provides information about this action to the ring-tone control section 42 (S74). The ring-tone control section 42 stops producing the ring-tone (S76), provides notification indicating failed registration (S78), and ends the reference echo tap coefficient registration process.

In the manner described above, the storage section 34 stores a plurality of reference echo tap coefficients for comparison to the echo tap coefficient. In this way, the control apparatus 18 determines the surrounding environment using the plurality of reference echo tap coefficients stored in the storage section 34, and adjusts the ring-tone. Accordingly, the control apparatus 18 can appropriately change the output ring-tone according to the surrounding environment, and can therefore reliably notify the user with the ring-tone.

FIG. 13 is used to describe the reference echo tap coefficient registration process performed by the control apparatus 18. FIG. 13A shows the screen of the electronic apparatus 10. The electronic apparatus 10 displays a screen used when in the reference echo tap coefficient registration mode. FIG. 13B shows a case in which the electronic apparatus 10 is stored in a pocket. FIG. 13C shows a case in which the electronic apparatus 10 is stored in a bag. FIG. 13D shows a case in which the electronic apparatus 10 is stored in a side pouch specially made for holding the electronic apparatus 10. The storage section 34 stores an echo tap coefficient corresponding to each of the surrounding environments such as shown in FIGS. 13B to 13D.

Figure 14A:
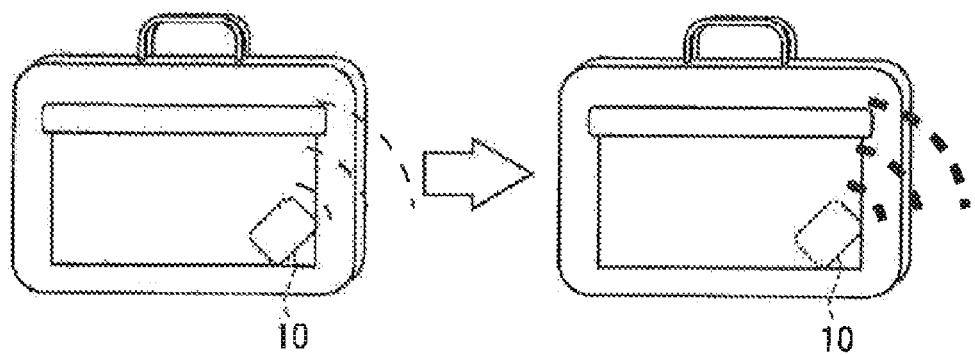
FIGS. 14A-C illustrate examples of the electronic apparatus 10 according to the present embodiment in use.
Figure 14B:
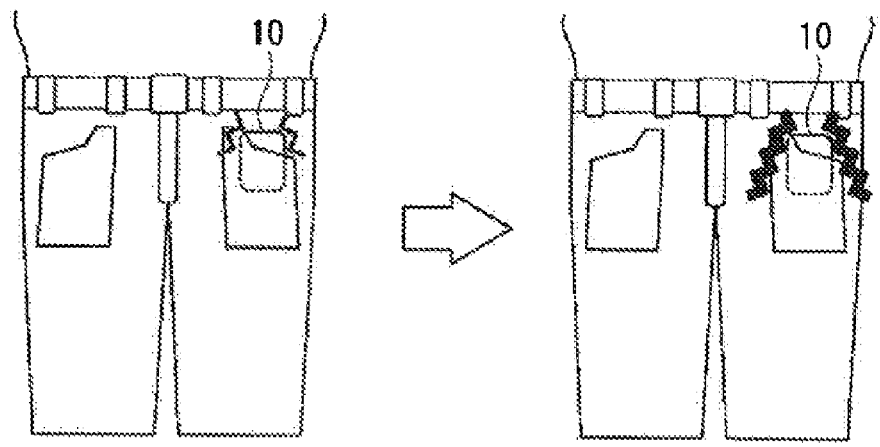
Figure 14C:
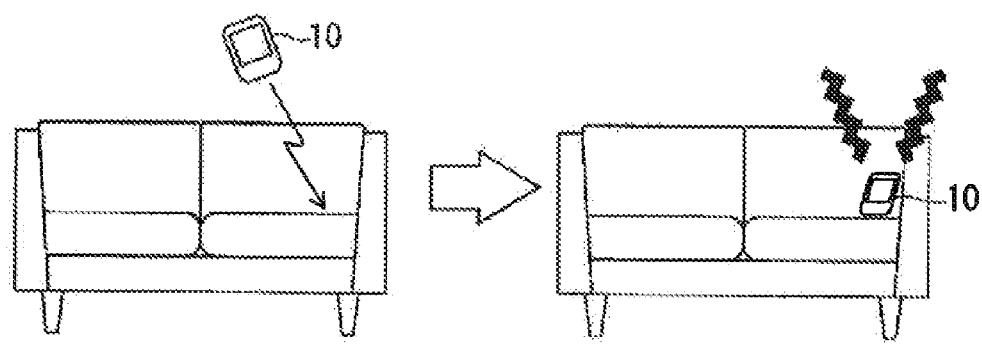

FIG. 14 shows an example of the electronic apparatus 10 according to the present embodiment in use. FIG. 14A shows a case in which the electronic apparatus 10 is stored in a bag. The control apparatus 18 of the electronic apparatus 10 detects that the electronic apparatus 10 is stored in a bag based on the echo of output sound, and adjusts the ring-tone to be easily recognized by the user. FIG. 14B shows a case in which the electronic apparatus 10 is stored in a pocket. The control apparatus 18 of the electronic apparatus 10 detects that the electronic apparatus 10 is stored in a pocket based on the echo of output sound, and adjusts the amplitude or period of the vibration of the vibration motor to be easily recognized by the user. FIG. 14C shows a case in which the electronic apparatus 10 is placed on a sofa. The control apparatus 18 of the electronic apparatus 10 detects that the electronic apparatus 10 is placed on a sofa based on the echo of output sound, and adjusts the ring-tone to be easily recognized by the user.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A control apparatus for an electronic apparatus comprising:
   a processor configured to
      receive a reception signal providing notification of reception,
      output a sound output signal causing a sound output section to generate a sound of the notification of reception,
      acquire a sound input signal generated from external sound that includes at least the sound output from the sound output section,
      generate an echo tap coefficient corresponding to an echo of the at least sound output from the sound output section, based on the sound output signal and the sound input signal,
      determine a correlation between the echo tap coefficient and a corresponding one of a plurality of stored reference echo tap coefficients, wherein the plurality of reference echo tap coefficients correspond to a plurality of states representing surrounding environments where the electronic apparatus is placed,
      select a corresponding one of the plurality of states based on the correlation, and
      adjust the sound output signal according to the corresponding one of the states.

2. The control apparatus according to claim 1, wherein the processor is further configured to
   store the plurality of reference echo tap coefficients in a storage section of the control apparatus.

3. The control apparatus according to claim 2, wherein the processor is further configured to
   store a correlation threshold value for determining the correlation between the echo tap coefficient and the corresponding one of the plurality of the stored reference echo tap coefficients.

4. The control apparatus according to claim 3, wherein the processor is further configured to
   adjust the sound output signal according to a comparison result between the correlation threshold value and the correlation between the echo tap coefficient and the corresponding one of the plurality of the stored reference echo tap coefficients.

5. The control apparatus according to claim 3, wherein the processor is further configured to
   adjust the sound output signal in a case where a correlation coefficient between the echo tap coefficient and the stored reference echo tap coefficient having a highest correlation is greater than or equal to the correlation threshold value.

6. The control apparatus according to claim 2, wherein the processor is further configured to
   store an adjustment parameter for adjusting the sound output signal set according to the corresponding one of the plurality of the stored reference echo tap coefficients.

7. The control apparatus according to claim 6, wherein the processor is further configured to
   adjust the sound output signal using the adjustment parameter corresponding to the corresponding one of the plurality of the stored reference echo tap coefficients.

8. The control apparatus according to claim 7, wherein the processor is further configured to
   adjust the sound output signal in a predetermined frequency band.

9. The control apparatus according to claim 1, wherein the processor is further configured to
   enhance a predetermined frequency component in the sound output signal more than other frequency components.

10. The control apparatus according to claim 1, wherein the processor is further configured to
    enhance a low frequency component in the sound output signal more than other frequency components.

11. The control apparatus according to claim 1, wherein the processor is further configured to
    adjust the sound output signal corresponding to a reference echo tap coefficient among the plurality of stored reference echo tap coefficients that has a highest correlation with the echo tap coefficient.

12. The control apparatus according to claim 1, wherein the processor is further configured to
    adjust a volume of the sound output signal corresponding to the corresponding one of the plurality of the stored reference echo tap coefficients.

13. The control apparatus according to claim 1, wherein the processor is configured to further receive a remote input digital signal of an audio signal for conversation and generate a sound of the conversation.

14. The control apparatus according to claim 1, wherein the plurality of states include at least any two of a first surrounding environment where the electronic apparatus is in a pocket, a second surrounding environment where the electronic apparatus is in a bag, a third surrounding environment where the electronic apparatus is on a sofa, and a fourth surrounding environment where the electronic apparatus is outside the pocket or outside the bag.

15. The control apparatus according to claim 1, wherein the processor is further configured to adjust amplitude or period of vibration of a vibration motor of the electronic apparatus.

16. The control apparatus according to claim 1, wherein the processor is further configured to adjust frequency or luminosity of a light output from a light emitting member of the electronic apparatus.

17. A control method for an electronic apparatus, comprising:
    receiving a reception signal providing notification of reception;
    outputting a sound output signal causing a sound output section to generate a sound of the notification of reception;
    acquiring a sound input signal generated from external sound that includes at least the sound output from the sound output section;
    generating an echo tap coefficient corresponding to an echo of the at least sound output from the sound output section, based on the sound output signal and the sound input signal;
    determining a correlation between the echo tap coefficient and a corresponding one of a plurality of stored reference echo tap coefficients, wherein the plurality of reference echo tap coefficients correspond to a plurality of states representing surrounding environments where the electronic apparatus is placed,
select a corresponding one of the plurality of states based on the correlation, and
adjusting the sound output signal according to the corresponding one of the states.

18. The control method according to claim 17, further comprising:
receiving a remote input digital signal of an audio signal for conversation and generating a sound of the conversation.

19. The control method according to claim 17, wherein the plurality of states include at least any two of a first surrounding environment where the electronic apparatus is in a pocket, a second surrounding environment where the electronic apparatus is in a bag, a third surrounding environment where the electronic apparatus is on a sofa, and a fourth surrounding environment where the electronic apparatus is outside the pocket or outside the bag.

20. The control method according to claim 17, further comprising:
adjusting amplitude or period of vibration of a vibration motor of the electronic apparatus.

21. The control method according to claim 17, further comprising:
adjusting frequency or luminosity of a light output from a light emitting member of the electronic apparatus.

22. A non-transitory computer-readable medium that stores a program that causes a processor to perform functions for an electronic apparatus, comprising:
receiving a reception signal providing notification of reception;
outputting a sound output signal causing a sound output section to generate a sound of the notification of reception;
acquiring a sound input signal generated from external sound that includes at least the sound output from the sound output section;
generating an echo tap coefficient corresponding to an echo of the at least sound output from the sound output section, based on the sound output signal and the sound input signal;
determining a correlation between the echo tap coefficient and a corresponding one of a plurality of stored reference echo tap coefficients, wherein the plurality of reference echo tap coefficients correspond to a plurality of states representing surrounding environments where the electronic apparatus is placed,
select a corresponding one of the plurality of states based on the correlation, and
adjusting the sound output signal according to the corresponding one of the states.

23. The non-transitory computer-readable medium according to claim 22, further comprising:
receiving a remote input digital signal of an audio signal for conversation and generating a sound of the conversation.

24. The non-transitory computer-readable medium according to claim 22, wherein the plurality of states include at least any two of a first surrounding environment where the electronic apparatus is in a pocket, a second surrounding environment where the electronic apparatus is in a bag, a third surrounding environment where the electronic apparatus is on a sofa, and a fourth surrounding environment where the electronic apparatus is outside the pocket or outside the bag.

25. The non-transitory computer-readable medium according to claim 22, further comprising:
adjusting amplitude or period of vibration of a vibration motor of the electronic apparatus.

26. The non-transitory computer-readable medium according to claim 22, further comprising:
adjusting frequency or luminosity of a light output from a light emitting member of the electronic apparatus.

* * * * *